(12) United States Patent
Fan et al.

(10) Patent No.: US 10,931,146 B2
(45) Date of Patent: Feb. 23, 2021

(54) METHODS AND APPARATUSES FOR WIRELESS TRANSFER OF POWER

(71) Applicant: The Board of Trustees of the Leland Stanford Junior University, Stanford, CA (US)

(72) Inventors: Shanhui Fan, Stanford, CA (US); Sid Assawaworrarit, Redwood City, CA (US); Xiaofang Yu, San Mateo, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 263 days.

(21) Appl. No.: 15/899,217

(22) Filed: Feb. 19, 2018

(65) Prior Publication Data
US 2018/0241252 A1    Aug. 23, 2018

Related U.S. Application Data

(60) Provisional application No. 62/462,032, filed on Feb. 22, 2017.

(51) Int. Cl.
| | |
|---|---|
| *H02J 50/12* | (2016.01) |
| *H02J 50/05* | (2016.01) |
| *H02J 50/90* | (2016.01) |
| *H04B 5/00* | (2006.01) |
| *H02J 50/40* | (2016.01) |

(52) U.S. Cl.
CPC .............. *H02J 50/12* (2016.02); *H02J 50/05* (2016.02); *H02J 50/90* (2016.02); *H04B 5/0037* (2013.01); *H04B 5/0075* (2013.01); *H04B 5/0081* (2013.01); *H02J 50/40* (2016.02)

(58) Field of Classification Search
None
See application file for complete search history.

(56) References Cited

U.S. PATENT DOCUMENTS

| | | |
|---|---|---|
| 1,119,732 A | 12/1914 | Tesla |
| 2009/0284220 A1 | 11/2009 | Toncich et al. |
| 2010/0038970 A1 | 2/2010 | Cook et al. |
| 2012/0228953 A1* | 9/2012 | Kesler ................. H03H 7/40 307/104 |

(Continued)

OTHER PUBLICATIONS

N. de N. Donaldson, T. A. Perkins, Analysis of resonant coupled coils in the design of radio frequency transcutaneous links. Med. Biol. Eng. Comput. 21, 612-627 (1983).

(Continued)

*Primary Examiner* — Jared Fureman
*Assistant Examiner* — Aqeel H Bukhari
(74) *Attorney, Agent, or Firm* — Crawford Maunu PLLC

(57) ABSTRACT

Various embodiments are directed to apparatuses and methods related to source circuitry that provide power to other circuitry. The source circuitry including gain circuitry and a source resonator. The gain circuitry provide powers to the source resonator with a gain that is dependent on a coupling rate between the source circuitry and other circuitry. The source resonator is coupled to the gain circuitry and generates a magnetic field in response to the power. The source circuitry is configured and arranged to wirelessly transfer the power to the other circuitry via the magnetic field.

23 Claims, 13 Drawing Sheets

(56) References Cited

U.S. PATENT DOCUMENTS

| | | | | |
|---|---|---|---|---|
| 2013/0020878 | A1* | 1/2013 | Karalis | H02J 7/025 307/104 |
| 2016/0087687 | A1* | 3/2016 | Kesler | H04B 5/0037 307/104 |

OTHER PUBLICATIONS

W. C. Brown, The History of Power Transmission by Radio Waves. IEEE Trans. Microw. Theory Tech. 32, 1230-1242 (1984). Abstract Only.

W. J. Heetderks, RF powering of millimeter- and submillimeter-sized neural prosthetic implants. IEEE Trans. Biomed. Eng. 35, 323-327 (1988). Abstract Only.

C. M. Zierhofer, E. S. Hochmair, High-efficiency coupling-insensitive transcutaneous power and data transmission via an inductive link. IEEE Trans. Biomed. Eng. 37, 716-722 (1990).

P. R. Troyk, M. A. K. Schwan, Closed-loop class E transcutaneous power and data link for MicroImplants. IEEE Trans. Biomed. Eng. 39, 589-599 (1992). Abstract Only.

H. A. Haus, Waves and Fields in Optoelectronics (Prentice-Hall series in solid state physical electronics) (Prentice Hall, 1984). Abstract Only.

C. M. Bender, S. Boettcher, Real Spectra in Non-Hermitian Hamiltonians Having PT-Symmetry. Phys. Rev. Lett. 80, 5243-5246 (1998).

N. O. Sokal, "Class E high-efficiency power amplifiers, from HF to microwave," in 1998 IEEE MTT-S International Microwave Symposium Digest (Cat. No. 98CH36192), vol. 2, pp. 1109-1112.

D. A. G. Pedder, A. D. Brown, J. A. Skinner, A contactless electrical energy transmission system. IEEE Trans. Ind. Electron. 46, 23-30 (1999).

C. M. Bender, D. C. Brody, H. F. Jones, Complex extension of quantum mechanics. Phys. Rev. Lett. 89, 270401 (2002).

A. Kurs et al., Wireless Power Transfer via Strongly Coupled Magnetic Resonances. Science (80-. ). 317, 83-86 (2007).

M. K. Kazimierczuk, RF Power Amplifiers (John Wiley & Sons, 2008).

K. G. Makris, R. El-Ganainy, D. N. Christodoulides, Z. H. Musslimani, Beam dynamics in PT symmetric optical lattices. Phys. Rev. Lett. 100, 103904 (2008).

A. Guo et al., Observation of PT-symmetry breaking in complex optical potentials. Phys. Rev. Lett. 103, 93902 (2009).

J. L. Villa, J. Sallán, A. Llombart, J. F. Sanz, Design of a high frequency Inductively Coupled Power Transfer system for electric vehicle battery charge. Appl. Energy. 86, 355-363 (2009).

C. E. Rüter et al., Observation of parity-time symmetry in optics. Nat. Phys. 6, 192-195 (2010).

T. C. Beh, T. Imura, M. Kato, Y. Hori, Basic study of improving efficiency of wireless power transfer via magnetic resonance coupling based on impedance matching. Ind. Electron. (ISIE), 2010 IEEE Int. Symp., 2011-2016 (2010).

Z. Lin et al., Unidirectional invisibility induced by PT-symmetric periodic structures. Phys. Rev. Lett. 106, 213901 (2011).

J. Huh, S. W. Lee, W. Y. Lee, G. H. Cho, C. T. Rim, Narrow-Width Inductive Power Transfer System for Online Electrical Vehicles. IEEE Trans. Power Electron. 26, 3666-3679 (2011). Abstract only.

A. P. Sample, D. A. Meyer, J. R. Smith, Analysis, experimental results, and range adaptation of magnetically coupled resonators for wireless power transfer. IEEE Trans. Ind. Electron. 58, 544-554 (2011).

N. Y. Kim, K. Y. Kim, J. Choi, C.-W. Kim, Adaptive frequency with power-level tracking system for efficient magnetic resonance wireless power transfer. Electron. Lett. 48, 452 (2012).

J. Schindler et al., PT-symmetric electronics. J. Phys. A Math. Theor. 45, 444029 (2012).

M. Liertzer et al., Pump-induced exceptional points in lasers. Phys. Rev. Lett. 108 (2012), doi:10.1103/PhysRevLett.108.173901.

X. Yu et al., Wireless power transfer in the presence of metallic plates: Experimental results. AIP Adv. 3, 62102 (2013).

J. Shin et al., Design and Implementation of Shaped Magnetic-Resonance-Based Wireless Power Transfer System for Roadway-Powered Moving Electric Vehicles. IEEE Trans. Ind. Electron. 61, 1179-1192 (2014).

B. Peng et al., Parity-time-symmetric whispering-gallery microcavities. Nat. Phys. 10, 394 (2014).

L. Feng, Z. J. Wong, R.-M. Ma, Y. Wang, X. Zhang, Single-mode laser by parity-time symmetry breaking. Science (80-. ). 346, 972-975 (2014).

H. Hodaei, M.-A. Miri, M. Heinrich, D. N. Christodoulides, M. Khajavikhan, Parity-time—symmetric microring lasers. Science (80-. ). 346, 975 (2014). Abstract only.

B. Peng et al., Loss-induced suppression and revival of lasing. Science. 346, 328-332 (2014).

J. S. Ho et al., Wireless power transfer to deep-tissue microimplants. Proc. Natl. Acad. Sci. U. S. A. 111, 201403002 (2014).

A. Brecher, D. Arthur, "Review and Evaluation of Wireless Power Transfer (WPT) for Electric Transit Applications" (2014).

Siqi Li, C. C. Mi, Wireless Power Transfer for Electric Vehicle Applications. IEEE J. Emerg. Sel. Top. Power Electron. 3, 4-17 (2015).

A. U. Hassan, H. Hodaei, M. A. Miri, M. Khajavikhan, D. N. Christodoulides, Nonlinear reversal of the PT-symmetric phase transition in a system of coupled semiconductor microring resonators. Phys. Rev. A—At. Mol. Opt. Phys. 92, 63807 (2015).

L. Ge, R. El-Ganainy, Nonlinear modal interactions in parity-time (PT) symmetric lasers. Sci. Rep. 6, 24889 (2016).

S. Assawaworrarit, X. Yu, and S. Fan, "Robust wireless power transfer using a nonlinear parity-time-symmetric circuit," Nat. Publ. Gr., vol. 546, 2017.

G. Lerosey, "Applied physics: Wireless power on the move," Nature, vol. 546, No. 7658, pp. 354-355, Jun. 2017.

P. E. K. Donaldson. "Three separation-insensitive radiofrequency inductive links." Journal of Medical Engineering & Technology, 11:1, 23-29 (1987).

* cited by examiner

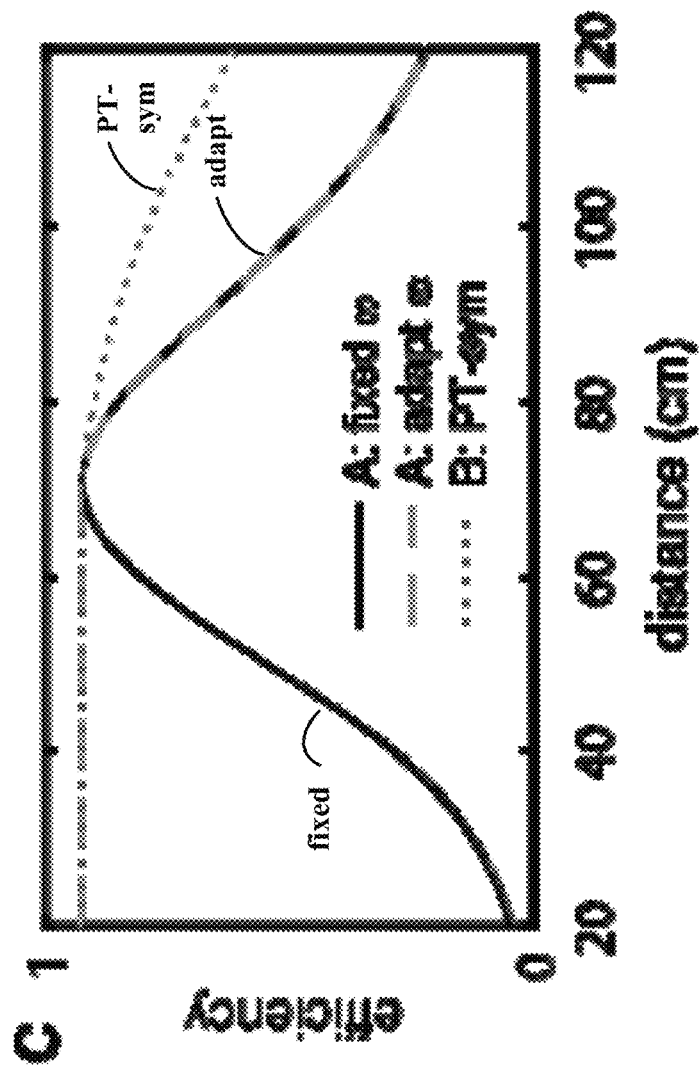
FIG. 3A
FIG. 3B
FIG. 3C

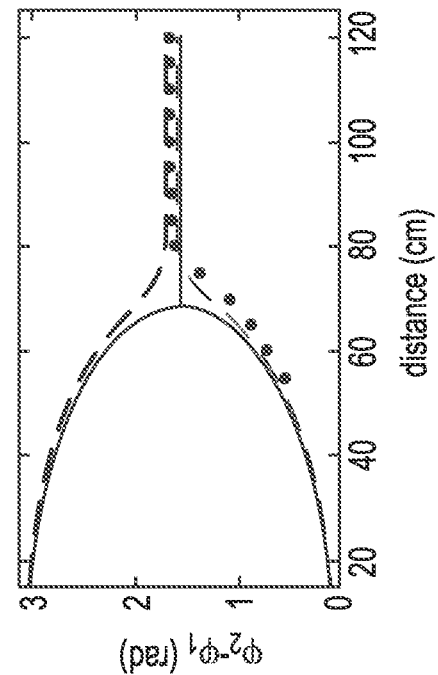
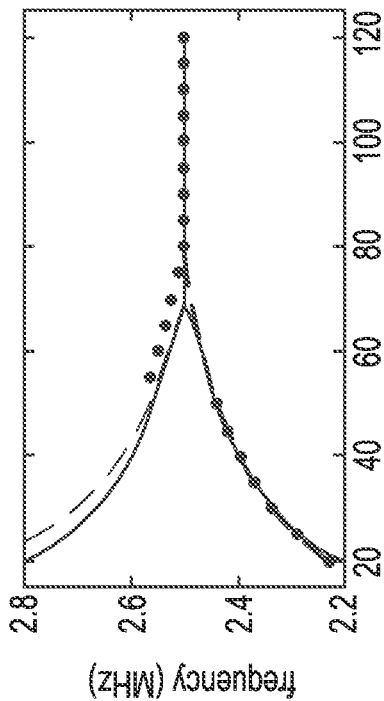
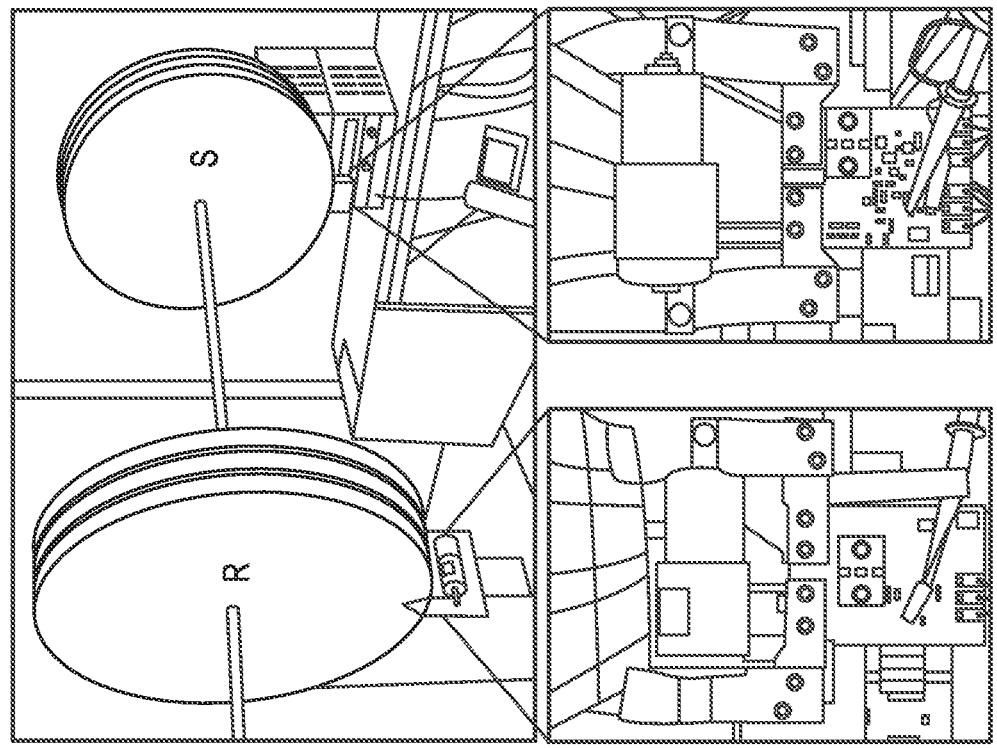
FIG. 5A
FIG. 5C
FIG. 5D

METHODS AND APPARATUSES FOR WIRELESS TRANSFER OF POWER

OVERVIEW

Aspects of various embodiments are directed to methods and apparatuses for wireless transfer of power.

Wireless power transfer has a long history of development dating back to the work of Nikola Tesla. Early development employed a focused, narrow microwave beam that led to an efficient, long-range, point-to-point power transfer but required proper tracking as a consequence of beam directionality. Significant progress has been made in the realm of non-radiative transfer, which uses magnetic field coupling in the near field, usually with the help of circuit resonance, to transfer power wirelessly. The development of non-radiative wireless power transfer has paved the way toward real-world applications, such as wireless powering of implantable medical devices and wireless charging of stationary electric vehicles. However, it can be difficult to create a robust wireless power transfer system, e.g., to create a system in which the transfer efficiency is robust against the variation of operating conditions. Achieving a robust wireless power transfer can be useful, for example, in realizing dynamic power transfer for delivering power to moving objects, such as moving devices or vehicles, where the power and/or parameters, such as transfer distance and orientation can change continuously. The transfer distance can include a distance the power travels from the source to the receiver. Orientation changes can include angular elevation changes (e.g., one or more coils rotate at an angle, such as in the elevation plane from horizontal to vertical plane), and/or other angular or rotational changes (e.g., one or more coils rotate on its axis in the azimuth and/or rotate around a fixed component).

The above issues as well as others have presented challenges to wireless power transfer apparatuses for a variety of applications.

SUMMARY

The present invention is directed to overcoming the above-mentioned challenges and others related to apparatuses, devices, components, assemblies and products (including those completely/partially manufactured) and related methods to use, assemble and/or manufacture such apparatuses. The present invention is exemplified in a number of implementations and applications, some of which are summarized below as examples.

Various aspects of the present disclosure are directed to an apparatus including source circuitry that wirelessly powers other circuitry (e.g., receiver circuitry) utilizing a parity-time-symmetry based technique.

Certain example aspects of the present disclosure are directed toward source circuitry involving a source resonator coupled to gain circuitry. The gain circuitry provides power (e.g., energy) to the source resonator. The gain circuitry, in specific aspects, includes a voltage amplifier and a resistor. The power provided is dependent on a coupling effect, rate, and/or efficacy between the source circuitry and other (external) circuitry. For example, the gain circuitry can self-adjust a gain corresponding to the power provided as a function of the coupling effect, rate, and/or efficacy. The source resonator can self-adjust an operating frequency of the magnetic field based on a nonlinear gain of the gain circuitry, which can be used to provide an optimized transfer of power for the coupling rate. The adjustment is used to provide and/or results in a robust wireless power transfer, such as providing a transfer efficiency from the source circuitry to the other circuitry that is within a threshold across a range of coupling effects, rates, and/or efficacies. The source circuitry generates a magnetic field responsive to the power and wirelessly transfers the power to the other circuitry via the magnetic field. In specific aspects, the power transferred to the other circuitry is within a threshold power over a range of distances separating the source circuitry and the other circuitry.

Certain embodiments of the present disclosure are directed to an apparatus which includes the above-described source circuitry and further includes the other circuitry. The other circuitry comprises a receiver resonator coupled to load circuitry. The other circuitry can wirelessly receive the magnetic field and use the magnetic field to power the load circuitry.

In specific embodiments, the source resonator is configured and arranged with the gain circuitry to generate a magnetic field at a frequency in response to the provided power. In such embodiments, the other circuitry, which includes a receiver resonator, receives the magnetic field at the frequency. As previously described, the generated magnetic field is at the frequency that is optimal for wireless power transfer at the coupling effect, rate, and/or efficacy. And, the gain circuitry can provide a nonlinear saturable gain that is dependent on the coupling effect, rate, and/or efficacy between the source circuitry and the other circuitry and which is used to adjust the frequency of the magnetic field.

In related specific embodiments, the source circuitry can transfer wireless power to the other circuitry that is within a threshold power across a distance between the source circuitry and the other circuitry of between 0.1 meter to 1.0 meter. The source circuitry, in more-specific embodiments, can reach a steady state at a rate of between 0.1 millisecond to 3 milliseconds as a distance between the source circuitry and the other circuitry changes from 20 centimeters to 1 meter.

In other related and specific embodiments, the gain circuitry includes a switch-mode amplifier and feedback circuitry. The switch-mode amplifier can provide negative resistance, and may also cause a phase delay. The feedback circuitry is configured and arranged with the switch-mode amplifier to offset phase delay caused by the switch-mode amplifier. In various embodiments, the feedback circuitry includes an inductor and resistor arranged in parallel.

Embodiments of the present disclosure are directed toward an apparatus as previously described and further includes a plurality of source circuits located at different fixed and/or moving locations. Each source circuit can wirelessly transfer power to the other circuitry. For example, the other circuitry can receive a magnetic field from a particular source circuit of the plurality of source circuits that is respectively the closest distance to the other circuitry.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 3A-3C show examples of an apparatus including source circuitry with gain circuitry, an apparatus without gain circuitry, and experimental results of transfer efficiency for both apparatuses, consistent with embodiments of the present disclosure;

FIGS. 5A-5D show examples of various apparatuses, consistent with embodiments of the present disclosure;

Figure 1:
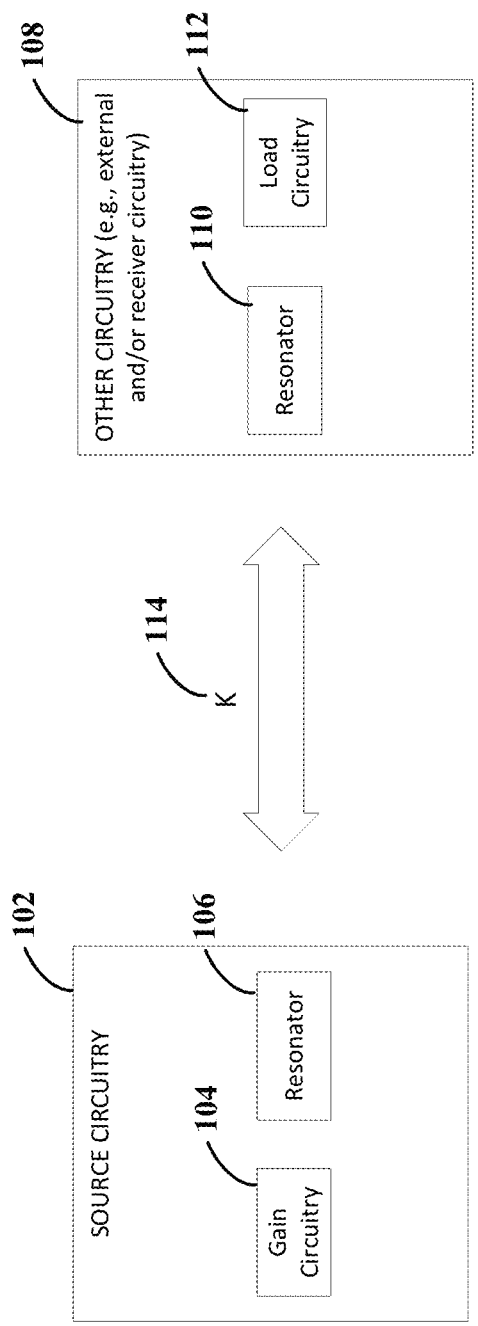
FIG. 1 shows an example apparatus including source circuitry and, optionally, other circuitry, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless transfer of power. In certain implementations, aspects of the present disclosure have been shown to be beneficial when used in the context of wireless power transfer when one or more of the source circuitry and receiver circuitry are moving over time. In some embodiments, the wireless transfer of power is achieved utilizing a parity-time-symmetry based technique. These and other aspects can be implemented to address challenges, including those discussed in the background above. While not necessarily so limited, various aspects may be appreciated through a discussion of examples using such exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Particular example embodiments are directed to wireless transfer of power achieved by non-radiative transfer, where magnetic field coupling in the near field is used to transfer power. An apparatus in accordance with various embodiments provides wireless transfer of power at a transfer efficiency that is robust against a variation of operating conditions. For example, the transfer distance between circuitry used to transfer wireless power (e.g., source and receiver) can change over time, such as in the instances of powering a moving vehicle or other mobile devices. Achieving a robust wireless power transfer is useful, for example, in realizing dynamic power transfer for delivering power to moving devices or vehicles, where the (power) transfer distance and/or direction can change continuously. A robust transfer efficiency, as used herein, includes or refers to a transfer efficiency of power from source circuitry as received by receiver circuitry that remains within a threshold across a range of coupling effects, rates, and/or efficiencies. For example, the transfer efficiency can remain within a threshold across a distance separating the source circuitry and receiver circuitry (e.g., a transfer distance) of a range of 0.1 meters to 1.0 meters. Non-radiative wireless power transfer can be beneficial for a variety of applications, such as wireless powering of implantable medical devices and wireless powering of stationary or moving electric vehicles.

Various embodiments are directed toward a parity-time (PT)-symmetry based wireless power technique used to achieve the robust wireless power transfer. In a PT-symmetry power transfer scheme, the source-receiver resonant coupling rate κ varies as a function of transfer distance d. PT-symmetric based apparatuses can be invariant under the joint parity and time reversal operation. In optics, where the symmetry conditions can be met by engineering of gain/loss regions and their coupling, PT symmetry has garnered interest due to their unique properties. A linear PT-symmetric system supports two phases depending on the magnitude of the gain/loss relative to the coupling strength. In the unbroken or exact phase, Eigenmode frequencies remain real and energy is equally distributed between the gain and loss regions; whereas, in the broken phase, one of the eigenmodes grows exponentially and the other decays exponentially. The PT symmetry concept can be explored and/or implemented in laser structures. The inclusion of nonlinear gain saturation in the analysis of a PT-symmetric system can result in a system that reaches a stationary state in a laser-like fashion that contains many PT symmetry characteristics, the selection of the lasing frequency based on that of the PT Eigen mode and the steady-state intensities controlled by the gain saturation mechanism. In accordance with various embodiments, a wireless power transfer apparatus utilizes PT symmetry with nonlinear gain saturation for wireless power transfer.

Certain embodiments of the present disclosure are directed toward source circuitry. The source circuitry includes a source resonator and gain circuitry. The gain circuitry provides power to the source resonator that is dependent on a coupling effect, rate, and/or efficacy between the source circuitry and other (external) circuitry. The other circuitry is external to the source circuitry and is sometimes referred to as "receiver circuitry." The gain circuitry can adjust a gain corresponding to the power as a function of the coupling effect, rate, and/or efficacy. The source circuitry, via the source resonator, generates a magnetic field responsive to the power and can wirelessly transfer power to the other circuitry via the magnetic field. The power transferred to the other circuitry can remain within a threshold transfer efficiency across a range of transfer distances due to the gain circuitry. For example, as described above, the gain circuitry adjusts a gain as a function of the coupling effect, rate, and/or efficacy, and provides power (with the gain) to the source resonator. The source resonator adjusts an operating frequency of the generated magnetic field, used to power the other circuitry, based on the nonlinear gain provided by the gain circuitry. The adjusted operating frequency can allow for the power transferred to the other circuitry to be within a threshold power over a range of distances separating the source circuitry and the other circuitry. In various specific embodiments, the source circuitry includes a plurality of source circuits, e.g., source resonators and gain circuitry, located at different locations.

Various embodiments include an apparatus that includes the above described source circuitry and further includes the other circuitry. The other circuitry includes a receiver resonator and load circuitry. The receiver resonator wirelessly receives the magnetic field and powers the load circuitry using the received magnetic field at the operating frequency.

Turning now to the figures, FIG. 1 shows an example apparatus including source circuitry and, optionally, other circuitry, consistent with embodiments of the present disclosure. The source circuitry 102 includes gain circuitry 104 and a source resonator 106. The source circuitry 102 can wirelessly transfer power to other (e.g., external) circuitry 108 via a magnetic field. For example, the source resonator 106 can generate a magnetic field based on power input to the source resonator 106 by the gain circuitry 104, as further described herein. The other circuitry 108 (e.g., receiver circuitry) includes a receiver resonator 110 and load circuitry 112. The receiver resonator 110 receives the magnetic field from the source resonator, which is used to power the load circuitry 112. The power generated by the receiver resonator 110 can be dependent on both the magnetic field generated by the source resonator 106 and a coupling rate 114 between the source resonator 106 and the receiver resonator 110.

In various embodiments, the coupling rate 114 can vary as a function of the transfer distance and/or orientation between the source resonator 106 and the receiver resonator 110. For example, one or more of the source circuitry 102 and the other circuitry 108 can be moving and/or otherwise change positions, which results in a change in the transfer distance over time. As previously described, it can be beneficial in various implementations to power the load circuitry 112 at a constant power or within a threshold amount, or to otherwise have a transfer efficiency of power from the source circuitry 102 to the other circuitry 108 that is consistent or within a threshold over a range of transfer distances (or other operating conditions), which is sometimes herein referred to as "robust wireless power transfer" for ease of reference.

The source resonator 106 can be an LC resonator having an inductor (L) and a capacitor (C). The source resonator 106 generates a magnetic field in response to power provided. The magnetic field generated can be at a particular operating frequency depending (primarily) on the geometry of the source resonator 106 and the secondarily on the gain circuitry 104 and the coupling between the gain circuitry 104 and the other (e.g., external) circuitry 108. Although not illustrated, the source circuitry 102 includes a power source coupled to the gain circuitry 104, which can provide power to the gain circuitry 104. The gain circuitry 104, responsive to the power, provides power to the source resonator 106 (with a gain) that is dependent on the coupling effect, rate, and/or efficacy between the source circuitry 102 and the other circuitry 108. For example, the gain circuitry 104 provides a nonlinear saturable gain (to the input power) that is dependent on the couple effect, rate, and/or efficacy. The gain is self-adjusted as a function of the coupling effect, rate, and/or efficacy. For example, the gain provided by the gain circuitry 104 can self-adjust responsive to changes in the transfer distance between the source resonator and receiver resonator. Such a self-adjustment of gain similarly results in the self-adjustment of the resonant frequency of the source circuitry 102 for an optimal match to the resonant frequency of the other circuitry 108 (e.g., receiver circuitry that is external to the source circuitry 102). In specific embodiments, the gain circuitry 104 can include a voltage amplifier and a resistor (that provide a negative resistance, as further described herein).

The source resonator 106 generates the magnetic field responsive to the power. The generated magnetic field is at a particular operating frequency which is based on the nonlinear gain provided by the gain circuitry 104. As previously described, the gain is self-adjusted by the gain circuitry 104 as a function of the coupling effect, rate, and/or efficacy. As a specific example, as the distance between the source circuitry 102 and the other circuitry 108 changes (e.g., increases or decreases) the coupling rate 114 also changes. The gain circuitry 104 responds to the changing coupling rate 114 by adjusting the gain provided and provides power from the gain to the source resonator 106. The source resonator 106 responds to the power (with the adjusted gain) by adjusting an operating frequency of the magnetic field generated and used to wirelessly transfer power to the other circuitry 108.

The operating frequency that the magnetic field is generated at can be optimal for wireless power transfer at the respective coupling effect, rate, and/or efficacy. For example, the source circuitry 102 can wirelessly transfer power to the other circuitry 108 at a transfer efficiency that is within a threshold amount across a range or a variety of coupling effects, rates, and/or efficacies between the source circuitry 102 and the other circuitry 108. As a specific example and based on experimental embodiments, the source circuitry 102 can transfer wireless power to the other circuitry 108 within a threshold power across a distance between the source circuitry 102 and the other circuitry 108 of between 0.1 meter to 1.0 meter. Further, the source circuitry 102 can reach a steady state at a rate of between 0.1 millisecond to 3 milliseconds as a distance between the source circuitry 102 and the other circuitry 108 changes from 20 centimeters to 1 meter. However, embodiments are not limited to such example ranges and rates, which are based on experimental embodiments and results using LC resonators having an inductive part made of three turns of 2.54 cm×0.25 mm copper ribbon rolled around a 58 cm diameter foam core. In general, the transfer distance scales with the size of the source resonator, a larger or smaller transfer distance can be achieved with the use of a larger or smaller source resonator, respectively.

As previously described, the other circuitry 108 includes a receiver resonator 110 and load circuitry 112. The receiver resonator 110 can be an LC resonator having an inductor and a capacitor. The receiver resonator 110 receives the magnetic field from the source resonator 106 at the operating frequency and converts the magnetic field to power (e.g., current). The power is provided to the load circuitry 112 (e.g., used to power the load circuitry 112). The power transferred to the other circuitry 108 can be within a threshold power over a range of distances separating the source circuitry 102 and the other circuitry 108.

Figure 2:
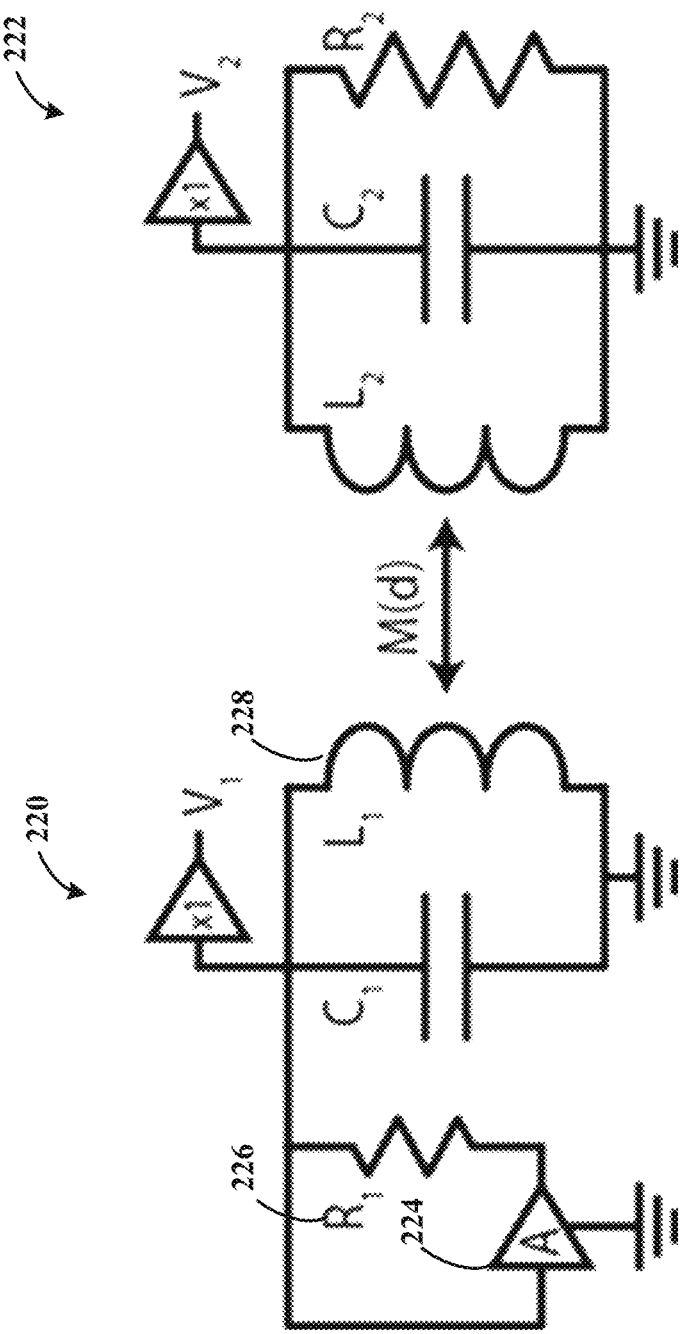
FIG. 2 shows an example apparatus for wireless power transfer, consistent with embodiments of the present disclosure.

FIG. 2 shows an example apparatus for wireless power transfer, consistent with embodiments of the present disclosure. As illustrated, the apparatus includes source circuitry 220 coupled to receiver circuitry 222 (sometimes herein called "other circuitry"). Each of the source and receiver circuitry 220, 222 include an LC resonator (e.g., resonator 228). The inductive (L) part of the LC resonator can include an inductive coil. In specific embodiments, the inductive coil includes multiple turns of copper ribbon rolled around a material (e.g., three turns of 2.54 cm×0.25 mm copper rolled around a 58 cm diameter foam cored). The conductive (C) portion of the LC resonator can include one or more capacitors (e.g., $C_1$ and $C_2$). For example, connecting the ends of the inductive coil is the one or more capacitors. The capacitor can be adjustable, in specific embodiments. Further, an additional fixed capacitor can be added to each resonator in parallel. The fixed capacitor can bring the resonant frequency to within the frequency range suitable for the amplifier.

In specific embodiments, additional circuitry is added to make a PT-symmetric wireless power transfer system. On the receiver circuitry, a resistor is added to function as a load (e.g., $R_2$). However, embodiments are not so limited and a variety of circuitry can be used as the load circuitry. On the source circuitry, a time-reversed analogue of a resistor—negative resistance—is added. This includes gain circuitry, e.g., an amplifier 224 and a resistor 226. In various embodiments, the amplifier 224 is made of an LM6171 high-speed opamp configured as a non-inverting amplifier with $R_f$=510Ω and $R_g$=5.1 kΩ, resulting in A~1.01, although embodiments are not so limited.

A table with example circuit component values is illustrated below. These values can be used in various experimental embodiments.

TABLE 1

| Circuit Parameters | | |
| --- | --- | --- |
| Parameter | Source | Receiver |
| $L_{1,2}$ (μH) | 9.13 | 8.92 |
| $C_{1,2}$ (pF) | 444 | 454 (455) |
| $f_0 = \omega_0/2\pi$ (MHz) | 2.50 | 2.50 |
| $Q_0$ (intrinsic) | 305 | 306 |
| A (V/V) | | 1.01 |
| $R_1$ (Ω) | | 42 (40) |
| $R_2$ (kΩ) | | 5.6 |
| $M/\sqrt{L_1 L_2}$ | 0.25-0.0066 | |

The circuit parameters illustrated in Table 1 can be used for various experimental embodiments. The numbers in parenthesis can be used to simulate the higher frequency branch.

FIGS. 3A-3C show examples of an apparatus including source circuitry with gain circuitry, an apparatus without gain circuitry, and experimental results of transfer efficiency for both apparatuses, consistent with embodiments of the present disclosure. In a conventional scheme, as illustrated by FIG. 3A, a harmonic wave at a frequency co is generated, coupled to the source resonator at a rate $\gamma_1$, which is transferred across a distance before being delivered to the load at the receiver resonator at a rate $\gamma_2$. In a PT-symmetric scheme, as illustrated by FIG. 3B, power is generated at the source resonator via gain circuitry with a gain rate $g_1$, transferred to and taken out at the receiver resonator by load circuitry with a loss rate $\gamma_2$. FIG. 3C illustrates an example of the transfer efficiency as a function of the separation distance between source and receiver circuitry for a conventional scheme without frequency tuning (solid line), a conventional scheme with adaptive frequency tuning (dashed line) and, a PT-symmetry based scheme (dotted line).

Figure 4B:
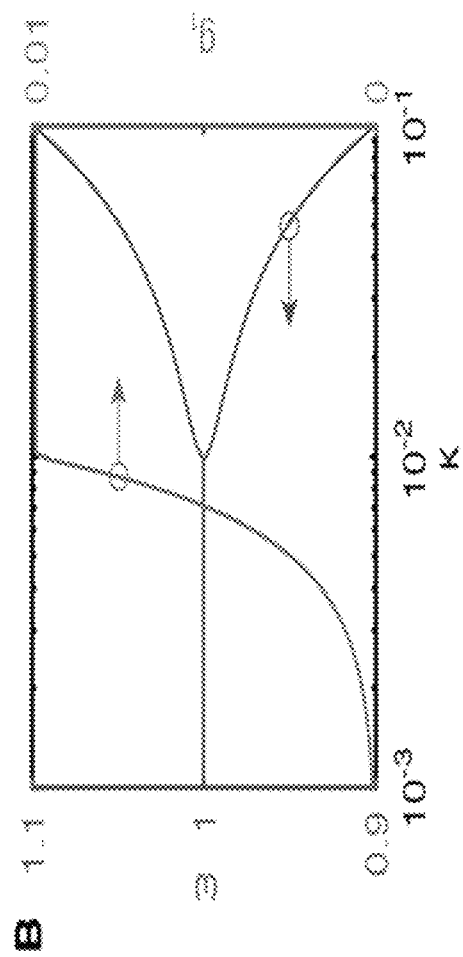
FIGS. 4A-4C show an example of an apparatus and experiment results including efficiency of wireless transfer of power, consistent with embodiments of the present disclosure.
Figure 4A:
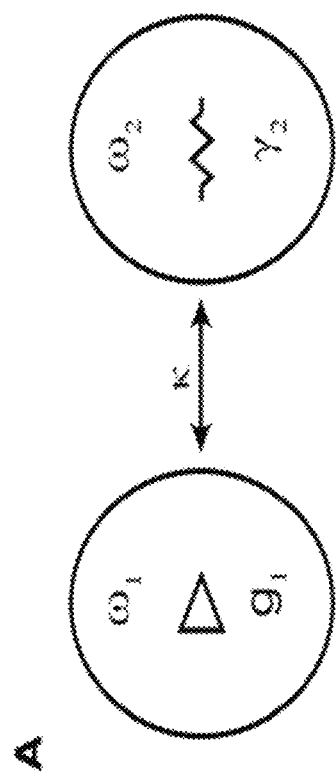
Figure 4C:
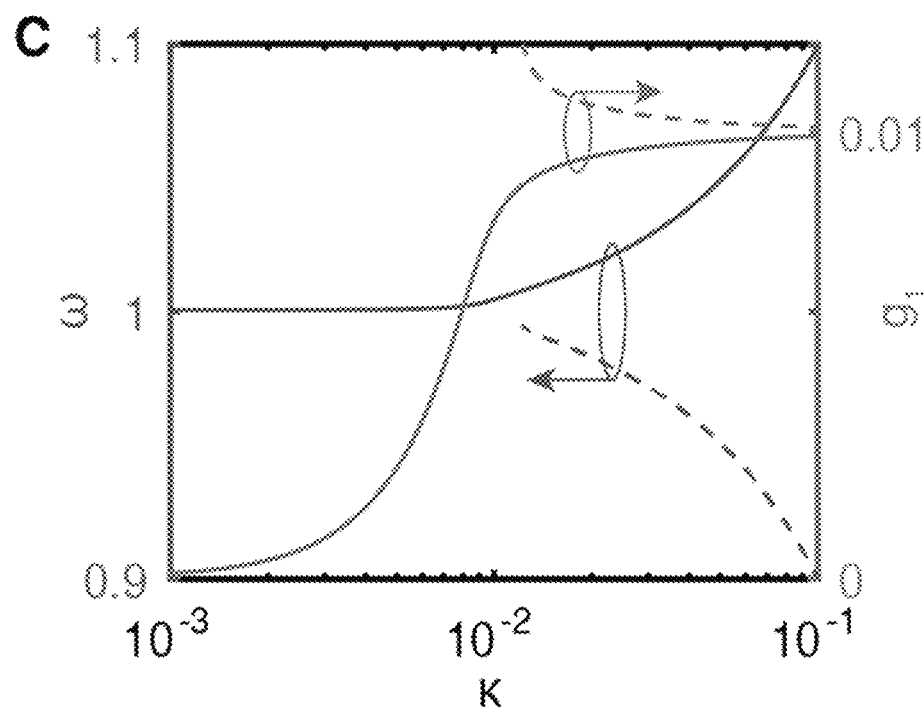

FIGS. 4A-4C show an example of an apparatus and experiment results including the efficiency of wireless transfer of power, consistent with embodiments of the present disclosure. Specifically, FIG. 4A illustrates a source resonator (e.g., gain resonator) and a receiver resonator (e.g., loss resonator) as previously illustrated and described by FIG. 2.

The following is a description of how PT symmetry can result in a robust wireless power transfer scheme using an example analysis based on the coupled-mode theory (CMT) model of a two-resonance apparatus consisting of a source resonator coupled to a receiver resonator as shown in FIG. 4A (as well as FIGS. 1 and 2). The source resonator has a resonant frequency $\omega_1$, a gain rate $g_{10}$, and an intrinsic loss rate $\gamma_{10}$, giving an overall gain rate $g_1=g_{10}-\gamma_{10}$. The receiver resonator has a resonant frequency $\omega_2 \approx \omega_1$ and a loss rate $\gamma_{10}=\gamma_1+\gamma_{20}$, where $\gamma_1$ is the loss rate contributed by the receiver's load and $\gamma_{20}$ is the intrinsic loss rate of the receiver. The two resonators are coupled together with a coupling rate κ, which in a wireless power transfer system is a function of the source-to-receiver separation distance. Power is fed into the source via the gain circuitry before being transferred through coupling to the receiver resonator. The apparatus dynamics can be described by:

$$\frac{d}{dt}\begin{bmatrix} a_1 \\ a_2 \end{bmatrix} = \begin{bmatrix} i\omega_1 + g_1 & -i\kappa \\ -i\kappa & i\omega_2 - \gamma_2 \end{bmatrix}\begin{bmatrix} a_1 \\ a_2 \end{bmatrix}, \quad (1)$$

where the subscript 1 refers to the source, the subscript 2 reference to the receiver, and $a_{1,2}$ are the field amplitudes defined such that $|a_{1,2}|^2$ represent the energies stored in each object. To find the Eigen frequencies, it can be assumed that $a_{1,2} \sim e^{i\omega t}$ and the characteristic equation can be obtained by:

$$(i(\omega_1-\omega)+g_1)(i(\omega_2-\omega)-\gamma_2)+\kappa^2=0. \quad (2)$$

Unlike the approach illustrated by FIG. 3A, where one imposes an externally fixed value of gain $g_1$ and computes the Eigen frequency, which in general is complex, the PT symmetric system has a nonlinear saturable gain. It can be assumed that $g_1$ depends on the energy stored in the source resonator $|a_1|^2$. In various embodiments, it is shown that for steady state dynamics, the detail of this dependency is not important. In experimental embodiments, a steady-state solution of Eq. 2 can be identified with a real co while allowing the variation of $g_1$. The strength of $g_1$ corresponding to such a steady-state solution can define the saturated gain level $g_{(1,sat)}$. Taking ω to be real, the real and imaginary parts of Eq. 2 can be separated to obtain:

$$(\omega - \omega_1)(\omega - \omega_2)^2 + \gamma_2^2(\omega - \omega_1) - \kappa^2(\omega - \omega_2) = 0, \quad (3)$$

$$g_{1,sat} = \gamma_2 \frac{\omega - \omega_1}{\omega - \omega_2}, \quad (4)$$

where Eq. 3 gives the Eigen frequencies co for a given loss rate $\gamma_2$ and coupling rate κ. Eq. 4 provides the corresponding saturated gain value as the system oscillates, such as a steady state with frequency ω. Additionally, despite the possibility of having multiple solutions for the stationary-state mode frequencies, for a gain model, the mode using the lowest gain can grow to reach its steady state and saturate out the gain, preventing or mitigating other modes from assessing the gain level to reach steady state oscillation.

In the case of a matched resonance ($\omega_1 = \omega_2 = \omega_0$) there can be two regions of solutions of Eqs. 3 and 4, depending on the relative values of κ and $\gamma_2$ as shown in FIG. 4B. In the strong coupling region κ≥$\gamma_2$), the apparatus illustrated by FIG. 4A supports two modes with frequencies $\omega = \omega_0 \pm \sqrt{(\kappa^2 - \gamma_2^2)}$, and these two modes have the same saturated gain that balances out the loss, e.g., a $g_{(1,sat)} = \gamma_2$. In addition, these two modes have equal amplitude distribution, e.g., $|a_2/a_1| = 1$. These modes satisfy PT-symmetry. Unlike the linear PT system, where the PT-symmetry of the Eigen modes in the exact phase is enforced by choosing a system Hamiltonian that is PT-symmetric, here the PT-symmetry of the Eigen modes emerges from the nonlinear dynamics of gain saturation: at steady state, the mode of the system automatically has PT symmetry. Although $\omega = \omega_0$ is also a solution of Eq. 3 in the strong coupling region, this mode uses a higher saturated gain as κ increases and is not shown in FIG. 4B. In the weak coupling region) (κ<$\gamma_2$), a real mode (e.g., only one real mode) is located at $\omega = \omega_0$, with the corresponding saturated gain $g_{(1,sat)} = \kappa^2/\gamma_2 < \gamma_2$. Similar to the linear PT system, a bifurcation in the real part of the modal frequency can be observed at κ=$\gamma_2$. Unlike the linear PT system, however, the imaginary of modal frequency in apparatuses in accordance with the present embodiment can remain zero in both regions. With a small resonance detuning ($|w_2 - w_1| < \gamma_2/2$), similar mode frequency and gain behaviors are retained albeit with one mode having the lowest saturated gain in the strong coupling region (FIG. 4C).

In the matched resonance case, provided the unsaturated gain $g_1$ is initially set slightly above the loss $\gamma_2$ in the receiver resonator, the power transfer efficiency at steady state can be given by:

$$\eta = \frac{2\gamma_l |a_2|^2}{2\gamma_{10}|a_1|^2 + 2\gamma_2|a_2|^2} = \begin{cases} \frac{\gamma_l}{\gamma_2} \cdot \frac{1}{1 + \frac{\gamma_{10}\gamma_2}{\kappa^2}}, & \kappa < \gamma_2 \\ \frac{\gamma_l}{\gamma_2} \cdot \frac{1}{1 + \frac{\gamma_{10}}{\gamma_2}}, & \kappa \geq \gamma_2 \end{cases} \quad (5)$$

In the strong coupling region, the transfer efficiency can be independent of κ and approaches unity in the limit $\gamma_{10}$, $\gamma_{20} \ll \gamma_1$. Efficiency is robust against fluctuation of distance or orientation of the resonators, both having the effects of changing κ. The efficiency in Eq. 5 matches the optimal efficiency for the conventional wireless transfer scheme based on two resonators assuming frequency-tuning for each κ, with some deviations as described below. Here, however, frequency tuning may not be performed (e.g., is unneeded). The nonlinear gain saturation allows for the parity-time symmetry of the steady state in the strong coupling region and (automatically) results in the operating frequency that is optimal for wireless power transfer.

FIGS. 4B and 4C illustrate stationary-state mode frequencies and their saturated gain rates as a function of coupling rate. The mode frequencies can be obtained by solving Eq. 3 for a loss rate $\gamma_2 = 0.10$ while the gain rates are obtained from Eq. 4. Specifically, FIG. 4B illustrates the matched resonance ($\omega_1 = \omega_2 = 1$). In the strong coupling region (κ≥$\gamma_2$), the solutions to the exact PT symmetric phase with balanced gain-loss ($g_1 = \gamma_2$) and mode frequency splitting of) $2\sqrt{(\kappa^2 - \gamma_2^2)}$ can be recovered. In the weak coupling region (κ<$\gamma_2$), gain saturation reduces the stationary-state gain further (g<$\gamma_2$) and results in the imaginary part of the usual solution of the PT symmetry's broken phase to zero. FIG. 4C illustrates similar mode frequency behavior that survives with a small detuning ($\omega_1 = 1$, $\omega_2 = 0.999$). The lower frequency branch in the strong coupling now uses higher gain rates (dashed lines).

MORE DETAILED/EXPERIMENTAL EMBODIMENTS

Various embodiments include a nonlinear PT-symmetric apparatus incorporating a nonlinear gain saturation circuitry. Such apparatuses can be used to achieve robust wireless power transfer; in particular, the frequency bifurcation leads to (high and) constant transfer efficiency in the strong coupling region without the use of active tuning.

As previously described, the apparatus includes source circuitry having a source resonator and other circuitry (e.g., receiver circuitry) having a receiver resonator. In the PT power transfer scheme, the frequency adjustment can be achieved by the nonlinear gain circuitry coupled with and/or in the source resonator. The timescale over which the circuit reaches steady state can be dependent on and/or a function of the coupling rate. In an example setup using 2.50 MHz, the response time to reach steady state can correspond to around 0.1 ms to a few milliseconds as the range goes from 20 cm to 1 meter. This response time can be fast enough to support dynamic charging for vehicles travelling at highway speed (e.g., 45 miles per hour to 100 miles per hour or more).

Figure 5B:
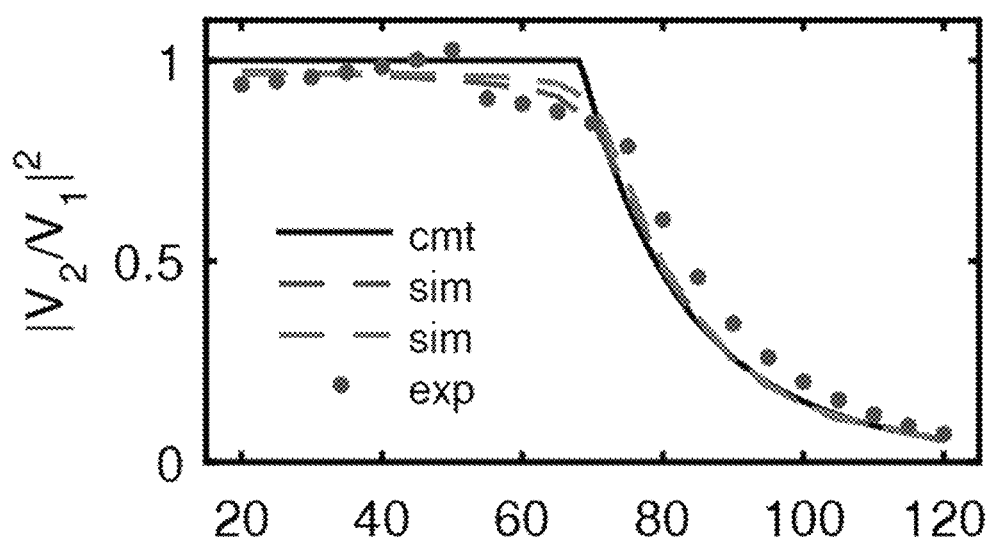

FIGS. 5A-5D show examples of various apparatuses, consistent with embodiments of the present disclosure. The apparatus, such as the previous apparatus illustrated by FIG. 2, includes a source resonator (e.g., gain resonator) and a receiver resonator (e.g., loss resonator). FIG. 5A illustrates an experimental embodiment of an example apparatus. FIGS. 5B-5D illustrate an example coupled-mode theory (cmt), circuit simulation (sim) and experimental measurements (exp) results showing voltage ratio (as illustrated by FIG. 5B), frequency (as illustrated by FIG. 5C) and phase (as illustrated by FIG. 5D). Two sets of simulations (red and magenta) use slightly different $C_2$ and $R_1$ to make frequency bifurcation visible.

In various specific and/or experimental embodiments, the theory presented above can be demonstrated in radio-wave frequency circuits and, more specifically, can demonstrate a robust wireless power transfer scheme. The gain circuitry, as previously described, includes a voltage amplifier and a feedback resistor as shown on the source side of the full circuit model in FIG. 2. The gain circuitry can provide a negative resistance. For example, with a voltage gain of A>1, the amplifier together with a feedback resistor $R_1$ functions as a resistor with a resistance of $-R_1/(A-1)$. This negative resistor feeds power to the source resonator which is coupled through magnetic induction to power the load circuitry (denoted by $R_2$) on the receiver resonator. Saturation can arises naturally from the amplifier's supply limit. To ensure the circuit operates in saturation, the unsaturated gain rate can be set slightly higher than the overall loss rate (by tuning $R_1$ for instance).

In some embodiments, a SPICE time-domain circuit simulation can be performed using a piecewise saturation model for the amplifier and theoretically calculated mutual inductance values M based on two identical coils of 58 cm diameter spaced 20-120 cm apart. The resonators' voltage ratio, frequency and phase are extracted from the simulated waveforms and shown in FIGS. 5B-D) (dashed lines). The simulations can be repeated with the receiver capacitor $C_2$ tuned up by 1 pF and $R_1$ lowered by 2Ω to obtain the higher frequency branch (dashed lines). The results of the circuit simulation are generally in agreement with the corresponding results obtained using CMT (black lines). Such a circuit can be used to demonstrate the robust power transfer as predicted from the coupled mode theory.

Based on the circuit simulation, in experimental embodiments, a prototype can be constructed, such as the apparatus as shown in FIG. 5A. Each of the two resonant coils can be formed by connecting three turns of copper sheet around a 58 cm foam core in parallel with a combination of fixed and tunable capacitors to allow tuning of their resonant frequencies to 2.50 MHz (measured Q≈300). A wooden rod, on which both resonators are arranged, maintains their coaxial alignment and allows the receiver resonator to slide towards or away from the source resonator with the separation distance ranging from 20-120 cm. An opamp, configured as a non-inverting amplifier with designed DC gain of 1.01, together with an adjustable resistor $R_1$≈40Ω, functions as a negative resistance element. A voltage follower is added to each resonator to allow monitoring of the voltages without disturbing the resonances.

The voltage ratio, frequency and phase results illustrated by FIGS. 5B-5D respectively, generally shows agreement between measurements and simulation results. In particular, the efficiency, as measured by the voltage ratio, remains near unity as the distance between the source and the receiver resonators varies from 20 to approximately 70 cm, without any tuning of the circuit. In experimental measurements, there is a transition of the steady state frequency between the two frequency branches at a distance near 50 cm. Such a transition does not affect the transfer efficiency, and can arise from small detuning of the resonators (such as the one in FIG. 4C) combined with frequency dependence of the gain and random fluctuation. As the power supply to the amplifier is capped, the abrupt nature of the amplifier's gain saturation maintains the source resonator voltage amplitude at 10.5 V with minimal variation across the separation. The power delivered to the load circuitry $\propto |V_2|^2$ follows the curve shown in FIG. 5B. In various experimental embodiments, the robustness of the PT power transfer scheme can be demonstrated by replacing the receiver's load with a light-emitting diode (LED) bulb. In contrast to a conventional scheme, where the LED brightness is dependent on the separation distance, apparatuses in accordance with the present embodiment can produce a brightness that remains constant as the receiver is moved away from the source until a separation distance of around a meter.

Further improvement in transfer efficiency can be achieved (as compared to the experimental embodiment illustrated by FIG. 5A) by increasing the intrinsic quality factor of the resonators to over 1000 from the current value of around 300, since the quality factor is currently limited by additional circuitry for measurements. As an opamp can be used as the gain circuitry, the amplifier efficiency can be around 10%. In other apparatuses, a (highly efficient) switched-mode power amplifier design can be used as the gain circuitry, and which are commercially available with efficiency close to 100%. Experimental embodiments also demonstrate phase transition in a nonlinear PT system, and thus points to a new direction in the experimental study of PT physics.

Various embodiments include a nonlinear PT symmetric configuration, in which the transfer efficiency is at a constant value close to unity across a range of distance referred to as the strong coupling region defined by the relative values of κ and $\gamma_2$. The efficiency value is given in Eq. 5 and is theoretically constant across the strong coupling region. In experimental embodiments (FIG. 5B), the efficiency can deviate as much as 8% as occurred at the transfer distance of 55 cm. This deviation can arise from (small) detuning of the resonators and can be reproduced with circuit simulation with different $C_2$ and $R_1$.

For a larger transfer distance, the weak coupling region (κ<$\gamma_2$) can be entered, where the efficiency begins to decrease with increasing separation. Here, one encounters the fundamental limit of near filed coupling which can affect wireless power transfer schemes.

The range over which useful wireless power transfer can be made is governed by the resonators' coupling rate, which is separation-dependent, relative to the receiver loss rate. The efficiency adaptation can vary with coaxial separation, but the same principle can be extended to include varying orientation as well. The range of around 1 meter is specific for an experiment 60-cm diameter coil setup and does scales with the coil size. In general, for a typical value of receiver loss rate one should expect the transfer range to be around the same order as the coil size. This is shown below in FIG. 7, where the coupling drops to around 1/20 to 1/50 of the frequency. Coil design as well as engineering of the surrounding environment to shape the magnetic fields can improve the range in some preferred direction.

In specific experimental embodiments, such as illustrated by FIGS. 5A-5D, each of the source and receiver resonators include or are an inductor made of three turns of 2.54 cm×0.25 mm copper ribbon rolled around a 58 cm diameter foam core. The inductor is in parallel with a 330 pF fixed capacitor on a circuit board and a standalone 5-85 pF tunable capacitor to allow tuning of their resonant frequencies to 2.50 MHz. A wooden rod, on which both resonators are arranged, maintains their coaxial alignment while allowing the receiver resonator to slide in and out from the source resonator. The separation distance, measured from the center of one resonator to the other, ranges from 20 cm to 120 cm. On the source circuit board, the amplifier denoted A in FIG. 2 which feeds power into the source resonator consists of an LM6171 high-speed opamp configured as a non-inverting amplifier with $R_f$=510Ω and $R_g$=5.1 kΩ. The gain rate is trimmed to an appropriate value by an adjustable feedback resistor $R_1$ which is set to around 40Ω. This gain circuit runs on a ±12 V power supply. The receiver circuit board hosts a resistor $R_2$=5/6 kΩ as load circuitry. In addition, each resonator has a follower, which runs on a separate ±15 V power supply, buffers the resonators' voltages to an oscilloscope to allow measurements of the amplitudes and the phases of the voltage oscillation without significantly interfering with the resonances.

In various experimental embodiments, time-domain SPICE circuit simulations are performed based on the same circuit model (FIG. 2) using the circuit parameters resembling the actual experiment. Table 51, as previously provided, gives example relevant parameters used. The inductances and quality factors are obtained from individual resonator measurements. The quality factors are limited (dominantly) by the inductive losses and are modelled by parasitic resistors in series with the inductors. The mutual inductances are experimentally obtained from frequency splitting (detailed in the next section) for the resonators' separation distances ranging from 20 cm to 120 cm at 5 cm interval. The amplifier voltage gain A is selected to match the designed linear gain of the actual amplifier while the feedback resistor $R_1$ is set so that the linear gain rate is slightly above threshold. The amplifier is assumed to be ideal apart from a saturation effect which is enforced by preventing the output voltage of the amplifier from going beyond ±1 V. For a given separation distance, a time-domain circuit simulation can be performed, which starts with a small initial voltage (1 μV) on the source resonator to kick start oscillations. Once the oscillation reaches a steady state, the waveforms are recorded, which are then analyzed to obtain the amplitudes, frequency and phase of the voltage oscillations. The simulations can be repeated with slightly modified $C_2$ and $R_1$ to simulate the higher frequency branch in the strong coupling region.

As a visualization of the wireless power transfer process, the receiver circuit board can be replaced with another one containing a 330 pF high-Q capacitor connected to a full-wave rectifier and a 1 kΩ resistor in series with a 5.5 Cd white LED as a load. Another adjustable capacitor is added to the receiver coil to increase its tuning range to match the source's resonance frequency (now at 2.47 MHz). With this configuration, the LED starts to emit faintly when the amplitude to the rectifier circuit reaches 3.5 V and becomes brightly lit when the voltage increases to 4.0 V. The power supply to the source is reduced to ±5.5 V so that the saturated amplitude in the source resonator is around 4.0 V, a power level that lights up the LED. As a result of such an arrangement, the PT phase transition from the unbroken to the broken phases coincides with the LED on/off states. As the receiver is moved in and out of the source, the brightness level on the receiver remains constant for a wide range of separation distance (e.g., of up to 1 meter) as a manifestation of robust power transfer of the PT symmetric scheme. The experiment can be repeated with a conventional wireless power transfer setup where the gain circuit is removed. For example, the power is fed into the source resonator via a coil (44 cm diameter, placed next to a source resonator) connected to a functioning generator running 0.5 V amplitude at the circuit resonance (2.47 MHz). The LED brightness varies as a function of the separation distance, with the brightness reaching its maximum around 60 cm and dimming once the receiver moves closer or further away.

Figure 6B:
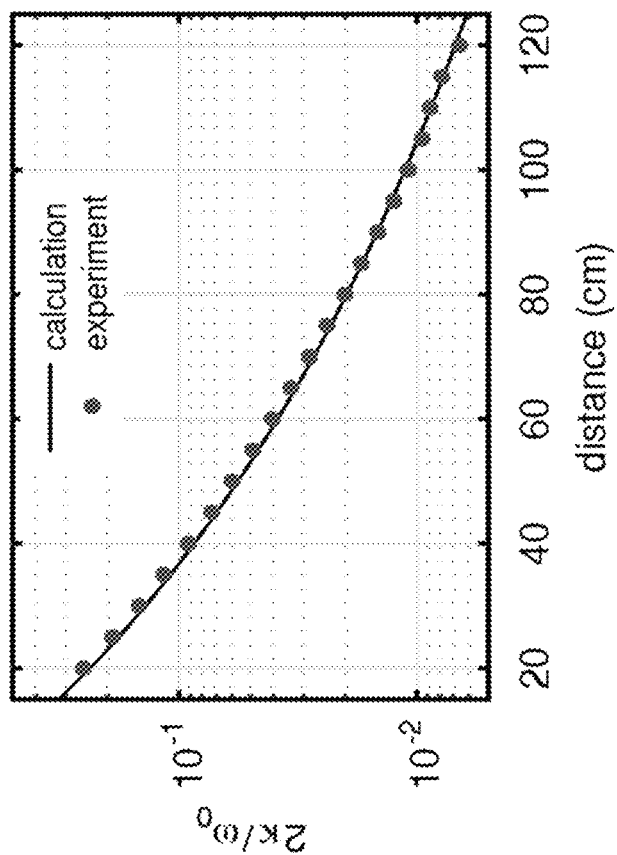
FIGS. 6A-6B show example apparatuses and experiment results, consistent with embodiments of the present disclosure.
Figure 6A:
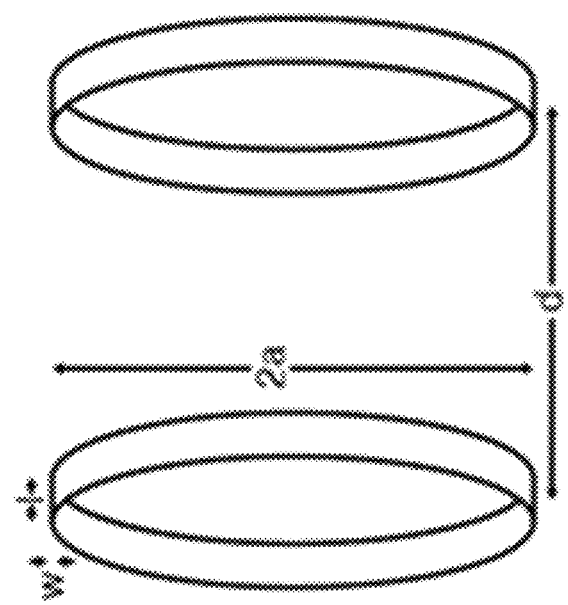

FIGS. 6A-6B show example apparatuses and experiment results, consistent with embodiments of the present disclosure. Magnetic field coupling is preferred in wireless power transfer applications since (most) everyday materials do not interact strongly with magnetic fields. The design of the coils, as well as the environment the fields occupy, can impact how the coupling rate changes with the coils' separation distance and orientation. Techniques explored in the realm of coupling rate engineering, such as magnetic field shaping to enhance the coupling strength, can improve the transfer range and efficiency further. As previously described, embodiments in accordance with the present disclosure include the power transfer and PT symmetry between two coppers coils spaced coaxially apart at various distances. In the quasi-static limit, the coupling rate between two identical coils is related to the mutual inductance by 2 $k/\omega_0 = M/L$ where M(L) is the mutual (self) inductance and can be calculated from, $$M = \frac{\mu_0 a^2}{2l} \int_0^{1-\frac{w}{2a}} \theta I_B\left(\theta, \frac{d}{a}\right) d\theta, \quad (6)$$

$$L = \frac{\mu_0 a^2}{2l} \int_0^{1-\frac{w}{2a}} \theta I_B(\theta, 0) d\theta, \quad (7)$$

$$I_B = \int_0^{2\pi} \int_{-\frac{l}{2a}}^{\frac{l}{2a}} \frac{1 - \theta \cos \phi}{[(\Omega - \xi)^2 + 1 + \theta^2 - 2\theta \cos \phi]^{3/2}} d\xi d\phi, \quad (8)$$

FIG. 6A illustrates the relevant dimensions and coupling rate as a function of separation distance. Example coil dimensions for the coupling rate calculation (Eq. 6-8) are as follows: ω=0.25 mm, 1=2.54 cm and 2a=58 cm. FIG. 6B illustrates a comparison of the calculated and experimental values of the coupling rate as a function of the separation distance between the two coaxially-aligned coils. By measuring the frequency splitting in the transmission spectrum of the two tuned resonant coils at various distances, the coupling rate κ can be found using the relation $$\kappa = \sqrt{\left(\gamma_0^1 + \left(\frac{\Delta\omega}{2}\right)^2\right)},$$

where $\gamma_0$ is the intrinsic loss rate and $\Delta\omega$ is the frequency splitting.

FIG. 6B shows agreement between the calculated and experimental values. Note that the coupling rate reduces by one order of magnitude as the distance increases from 20 cm to 60 cm. A scheme that relies on coupling-dependent parameter tuning to achieve efficiency may not be viable in the dynamic power transfer scenario, where the receiver continuously moves around the source (e.g., power delivery to a moving object, such as a moving vehicle).

Figure 7:
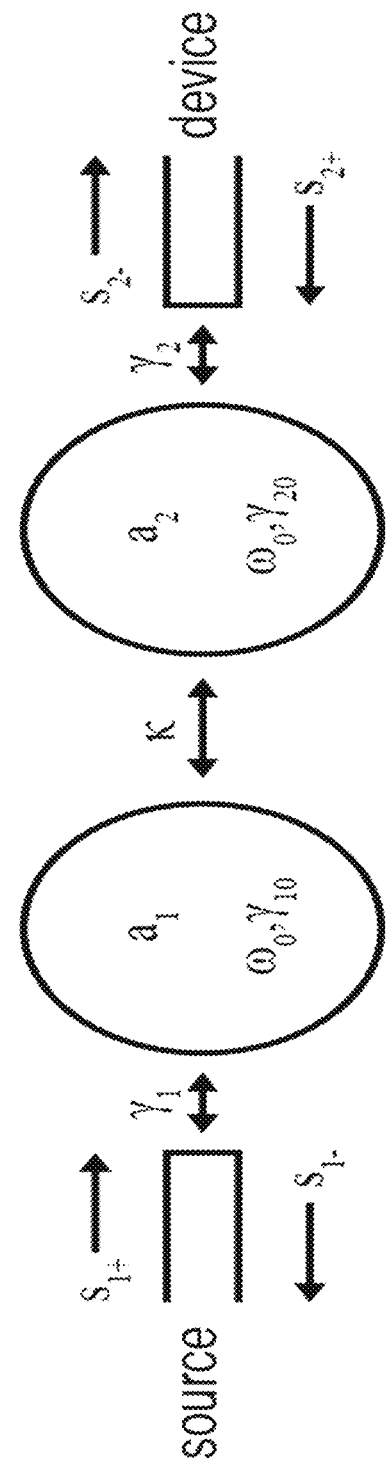
FIG. 7 shows an example apparatus, consistent with embodiments of the present disclosure.

FIG. 7 shows an example apparatus, consistent with embodiments of the present disclosure. Specifically, the conventional wireless power transfer setup as shown in FIG. 3A can be described with a two-port power transfer model as shown in FIG. 7. The coupled-mode equations in the model are as follows, $$s_{1-}(t) = -s_{1+}(t) + \sqrt{2\gamma_1} a_1(t), \quad (9)$$

$$\dot{a}_1(t) = (i\omega_0 - \gamma_{10} - \gamma_1)a_1(t) - i\kappa a_2(t) + \sqrt{2\gamma_1} s_{1+}(t), \quad (10)$$

$$\dot{a}_2(t) = (i\omega_0 - \gamma_{20} - \gamma_2)a_2(t) - i\kappa a_1(t), \quad (11)$$

$$s_{2-}(t) = \sqrt{\gamma_2} a_2(t), \quad (12)$$

where $\gamma_{(1(2))}$ are the loss rates arising from coupling between the source (receiver) and input (output) port whereas $\gamma_{(10(20))}$ are the intrinsic loss rates of the source (receiver) resonator. The waves $s_{(1+)}$, $s_{(1-)}$, and $s_{(2-)}$ are the input, reflected and output wave amplitudes, respectively while $s_{(2+)}=0$ since no power enters from the output port. For simplicity, a symmetric case ($\gamma_1=\gamma_2$ and $\gamma_{10}=\gamma_{20}=\gamma_0$) can be considered. For an input harmonic wave at frequency ω, the transfer efficiency can be, $$\eta = \left|\frac{s_{2-}}{s_{1+}}\right|^2 = \left|\frac{\kappa\sqrt{2\gamma_1}\sqrt{2\gamma_2}}{\kappa^2 + [i(\omega-\omega_0) + \gamma_1 + \gamma_{10}][i(\omega-\omega_0) + \gamma_2 + \gamma_{20}]}\right|^2, \quad (13)$$

which, under a symmetric case ($\gamma_1=\gamma_2=\gamma$ and $\gamma_{10}=\gamma_{20}=\gamma_0$), becomes, $$\eta = \left| \frac{2\kappa\gamma}{\kappa^2 + (i\Delta\omega + \tilde{\gamma})^2} \right|^2, \quad (14)$$

where $\Delta\omega=\omega-\omega_0$ and $\tilde{\gamma}=\gamma+\gamma_0$. To maximize $\eta$ in Eq. (14) given a fixed $\gamma_0$, the input/output coupling $\gamma=\sqrt{\kappa^2+\gamma_0^2}$ can be tuned by adjusting the orientation of the input (output) coil relative to the source (receiver) resonator to avoid mode splitting and operate the system at its resonant frequency ($\omega=\omega_0$). However, in a dynamic wireless power transfer scenario, tuning the coil-to-resonator coupling on-the-fly may not be practical. When a fixed coil-to-resonator coupling ($\gamma$) becomes an additional constraint, optimal efficiency is then obtained by frequency tuning which adjusts the feeding frequency in response to the changing source-receiver coupling as, $$\omega = \begin{cases} \omega_0, & \kappa \leq \tilde{\gamma} \\ \omega_0 \pm \sqrt{\kappa^2 - \tilde{\gamma}^2}, & \kappa > \tilde{\gamma} \end{cases}, \quad (15)$$

resulting in (high and) constant transfer efficiency throughout the strong coupling region. Having such a frequency tuning results in an improvement compared to a system without frequency tuning ($\omega=\omega_0$ for all values of $\kappa$), where the efficiency suffers when the receiver gets too close to the source. FIG. 3C shows the efficiency comparison between the conventional scheme (with and without frequency tuning) and the PT-symmetric scheme for the following parameters: $\omega_0=1$, $\gamma_0=5\times10^{-4}$ and $\gamma=0.0125$ for the conventional scheme and $\omega_{1,2}=1$, $\gamma_{10,20}=5\times10^{-4}$ and $\gamma_I=0.0125$ for the PT-symmetric scheme. The difference in the transfer efficiency between the conventional scheme with frequency tuning and the PT-symmetric scheme arises from the presence of reflection in the conventional scheme.

Figure 8:
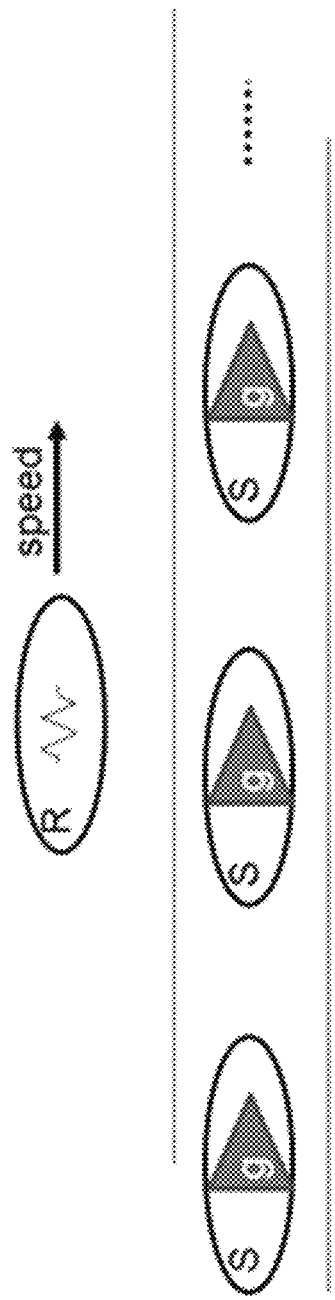
FIG. 8 shows an example apparatus including a plurality of source circuits, consistent with embodiments of the present disclosure.

FIG. 8 shows an example apparatus which includes a plurality of source circuits, consistent with embodiments of the present disclosure. In specific embodiments, the source circuitry includes a plurality of source circuits, each including a resonator and gain circuitry. The plurality of source circuits can be respectively located at different fixed and/or moving locations and can wirelessly transfer power to the other circuitry. In specific embodiments, the other circuitry can receive a magnetic field from the source circuit of the plurality of source circuits that is respectively the closest distance to the other circuitry. One possible configuration based on the nonlinear PT scheme involves arranging multiple source resonators in an array. For example, an array of identical source resonators with gain circuitry can be put below a road surface along a roadway. A vehicle, which includes other circuitry as previously described, travelling along can continuously receive power by picking up power from the nearest source resonator. In this scenario, a particular source resonator can sense the receiver coming into range either: (i) by an added communication channel between the receiver and source; or (ii) by the source sensing its drop in its energy as the receiver comes into range. The receiver can vary its power intake by tuning its loss rate, for example, no power is transferred if the receiver coil is shorted. Also, while only one receiver circuit is shown, various embodiments can include multiple receiver circuits that are placed along the array of the source circuits. In this case, the use of gain circuit array can result in transfer of power to multiple receiver circuits without interference between the receiver circuits.

Embodiments in accordance with the present disclosure involve circuitry that uses or otherwise includes an element to provide a negative resistance on the source resonator and to enable wireless power transfer that is robust against transfer distance variation. The negative resistance serves as a time-reversed counterpart to the (positive) resistive load on the receiver resonator. Such configuration is said to be parity-time (PT) symmetric. As previously described, the PT symmetry can lead to optimum transfer efficiency and robustness.

In a number of embodiments, such as those illustrated by FIG. 2, negative resistance is realized using an amplifier with voltage gain a in parallel with a feedback resistor R which together function as a negative resistance of $-R/(A-1)$. The amplifier can include an off-the-shelf general-purpose amplifier designed to work over a wide frequency range and may be around ten percent efficient.

In other more specific embodiments, the amplifier can include a switch-mode amplifier such as a class-E amplifier. A switch-mode amplifier can be highly-power efficient, as further illustrated herein. Amplifier inefficiency arises from having high levels of voltage and current flowing into the amplifier's transistor at the same time. Not only does increasing the efficiency of the amplifier have a direct effect of reducing unwanted power loss, it also helps increase the maximum power level that the circuit can handle. Because the waste heat generated from the amplifier inefficiency is often the limiting factor determining the maximum power the circuit can safely operate, an improvement in amplifier efficiency translates to higher power handling capability. By operating the transistor as an on-off switch, high-current and high-voltage durations are spread out in time resulting in little or no power loss. In particular, a class of switch-mode amplifiers known as class-E can achieve one hundred percent maximum efficiency in theory.

In such embodiments, the gain circuitry includes a switch-mode amplifier and feedback circuitry. The switch-mode amplifier can include a class-E amplifier, as described above.

Figure 9:
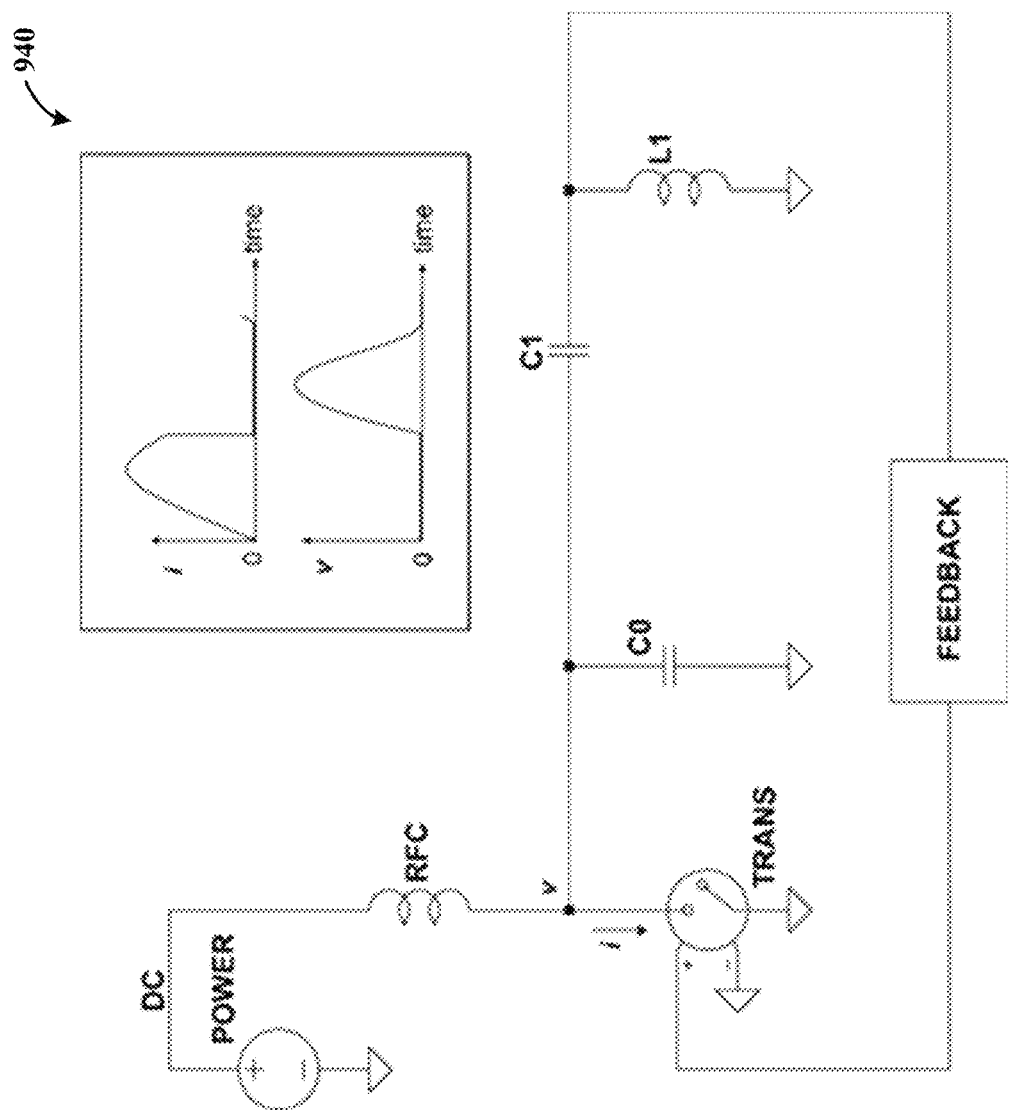
FIG. 9 shows an example of a switch-mode amplifier circuit, consistent with embodiments of the present disclosure.

FIG. 9 illustrates an example of a switch-mode amplifier circuit 940 in accordance with various embodiments. A transistor operating as an on-off switch inside the source resonator yields voltage and current waveforms across the transistor output that are displaced from each other in time (box) resulting in low power loss in the amplifier.

Incorporating the E-class amplifier into example wireless power transfer circuit involves more than just replacing the amplifier with a new one. The class-E amplifier has, by design, a phase delay of around 213 degrees for maximum efficiency while a feedback-amplifier circuit design requires zero or small phase delay from the amplifier. To incorporate class-E amplifier in the source circuitry, feedback circuitry is added to offset the effect of this phase delay. The class-E amplifier can be used for low amplifier loss and feedback circuitry that uses an inductor together with the resistor ($L_f$ and $R_f$) can reverse the effect of the phase delay. In specific embodiments, the total efficiency can be around 90 percent for a separation distance of up to 70 cm while the frequency exhibits a similar adaptation to other circuitry described herein as the separation distance changes. The circuit design is scalable to transfer higher power by ramping up the power supply voltage (DC power in FIG. 9).

Figure 10:
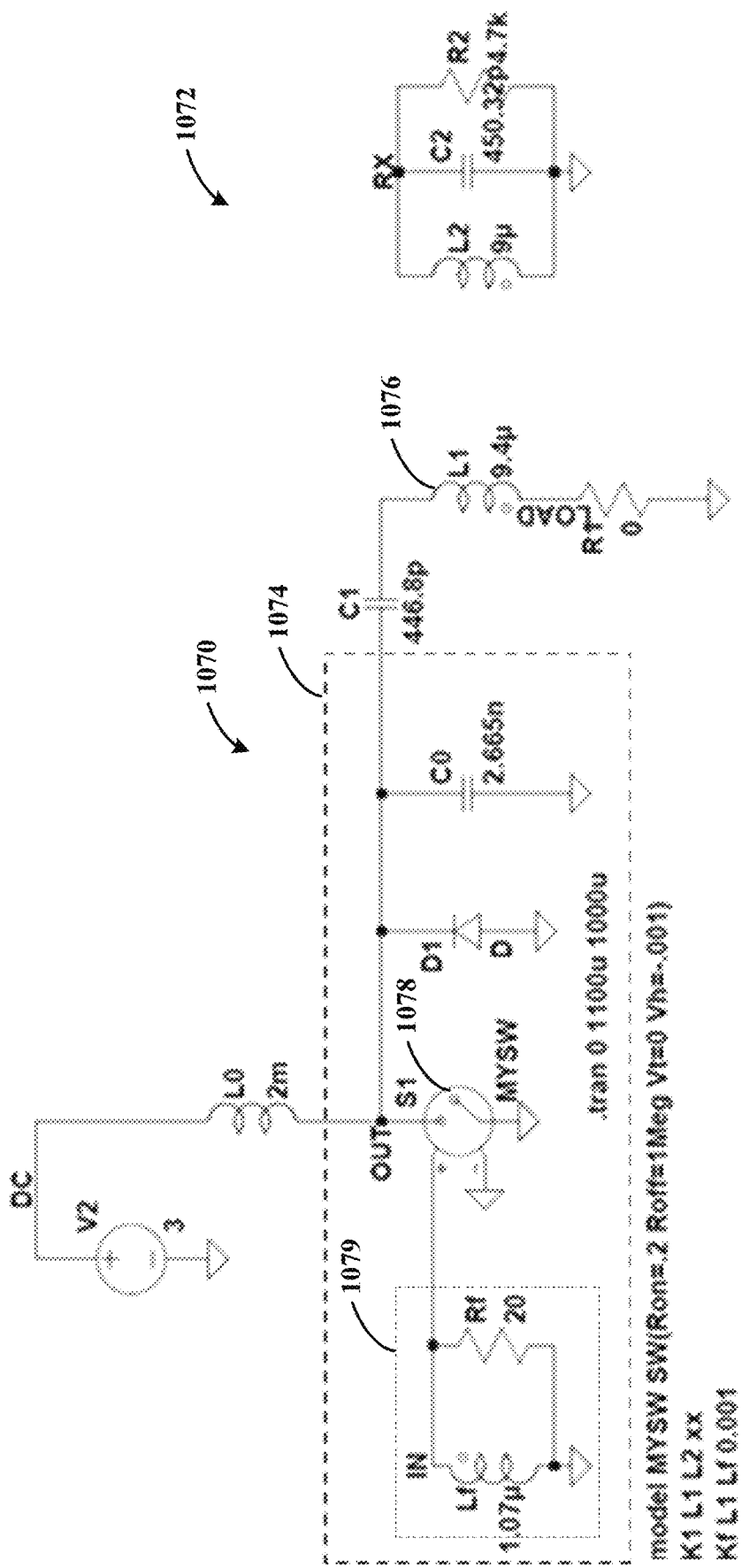
FIG. 10 shows an example apparatus, consistent with embodiments of the present disclosure.

FIG. 10 illustrates an example source circuitry in accordance with various embodiments. As previously described, the source circuitry 1070 includes gain circuitry 1074 and a source resonator 1076. The gain circuitry 1074 includes a switch-mode amplifier 1078 and feedback circuitry 1079. As previously described, the gain circuitry 1074 can provide power (energy) to the source resonator with a gain that is dependent on a coupling rate between the source circuitry 1070 and other circuitry 1072. The switch-mode amplifier 1078 can provide a negative resistance. In operation, the switch-mode amplifier 1078 can provide a phase delay. The feedback circuitry 1079 can offset the phase delay caused by the switch-mode amplifier. In specific embodiments, the feedback circuitry includes an inductor (e.g. Lf) and resistor (e.g., Rf) configured and arranged in parallel and that offset the phase delay.

Figure 11B:
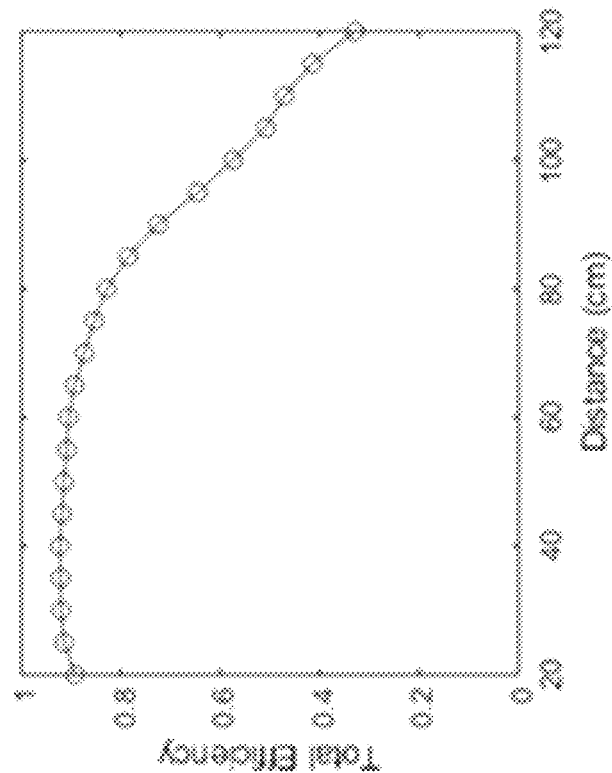
FIGS. 11A-11B show example efficiencies and frequencies of the apparatus illustrated by FIG. 10, consistent with embodiments of the present disclosure.
Figure 11A:
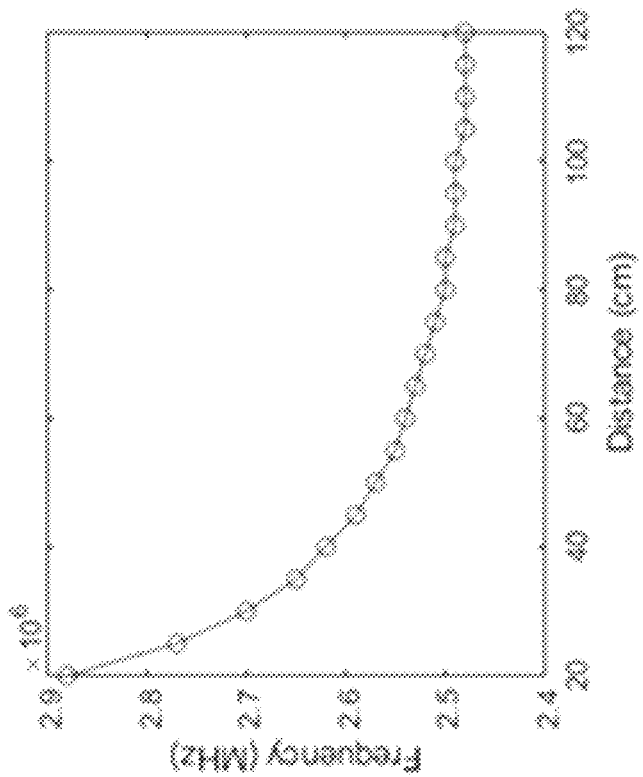

FIGS. 11A-11B illustrate example efficiencies and frequency of the source circuitry illustrated by FIG. 10, in accordance with various embodiments. Total efficiency and frequency adaptation is illustrated as the receiver of the other circuitry moves in and out from the source circuitry.

Terms to exemplify orientation, such as rotation, angle, distance, and transfer distance may be used herein to refer to relative positions of elements as shown in the figures (e.g., position of the source resonator relative to the receiver resonator). It should be understood that the terminology is used for notational convenience only and that in actual use the disclosed structures may be oriented different from the orientation shown in the figures. Thus, the terms should not be construed in a limiting manner.

Various embodiments are implemented in accordance with the underlying Provisional Application (Ser. No. 62/462,032), entitled "Methods and Apparatuses for Wireless Transfer of Power," filed Feb. 22, 2017, to which benefit is claimed and which are fully incorporated herein by reference. For instance, embodiments herein and/or in the provisional application (including the slides therein) may be combined in varying degrees (including wholly). Reference may also be made to the experimental teachings and underlying references provided in the underlying provisional application. Embodiments discussed in the slides are not intended, in any way, to be limiting to the overall technical disclosure, or to any part of the claimed invention unless specifically noted.

Various blocks, modules or other circuits may be implemented to carry out one or more of the operations and activities described herein and/or shown in the figures. In various example contexts as contemplated herein, various depicted functions carried out by such block, modules, etc. can be implemented using circuitry that carries out the related operations/activities. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein without departing from the true spirit and scope of various aspects of the disclosure, including aspects set forth in the claims.

What is claimed is:

1. An apparatus comprising source circuitry configured and arranged to provide power to other circuitry, the source circuitry including:

gain circuitry configured and arranged to provide power to a source resonator with a gain that is dependent on a coupling rate between the source circuitry and other circuitry; and the source resonator coupled to the gain circuitry and configured and arranged to generate a magnetic field in response to the power, wherein the source circuitry is configured and arranged to wirelessly transfer the power to the other circuitry via the magnetic field, wherein the source circuitry and the other circuitry are configured and arranged to transfer power according to parity-time symmetry wherein the amount of the gain to be manifested by the gain circuitry is to automatically adjust towards being balanced by a loss rate in the circuitry.

2. The apparatus of claim 1, wherein the source circuitry includes a source resonator configured to wirelessly transfer the power from the source circuitry to the other circuitry at a transfer efficiency that is within a threshold across a variety of coupling rates between the source circuitry and the other circuitry, and wherein during operation of the apparatus, the parity-time symmetry mitigates variance of the coupling rate as a function of a transfer distance separating the source circuitry and the other circuitry.

3. The apparatus of claim 1, wherein the gain circuitry includes a voltage amplifier and a resistor configured to provide nonlinear gain saturation, and wherein the source circuitry further is configured to wirelessly transfer the power to the other circuitry via the magnetic field while the parity-time symmetry is used with the nonlinear gain saturation for the wireless transfer of power.

4. The apparatus of claim 1, wherein the power transferred to the other circuitry is within a threshold power over a range of distances separating the source circuitry and the other circuitry, and wherein the source circuitry and the other circuitry are to transfer the power while maintaining the parity-time symmetry.

5. The apparatus of claim 1, wherein the gain circuitry is configured and arranged to adjust a gain corresponding to the power as a function of the coupling rate and causing a transfer efficiency from the source circuitry to the other circuitry that is within a threshold across a range of coupling rates.

6. The apparatus of claim 1, wherein the source circuitry is configured and arranged to adjust an operating frequency of the magnetic field based on a nonlinear gain of the gain circuitry.

7. The apparatus of claim 1, further including the other circuitry including a receiver resonator coupled to load circuitry, the receiver resonator being configured and arranged to wirelessly receive the magnetic field and to power the load circuitry using the magnetic field.

8. An apparatus comprising:

source circuitry including:

gain circuitry configured to provide power to the source circuitry, the power provided being dependent on a coupling rate between the source circuitry and other circuitry; and a source resonator configured with the gain circuitry to generate a magnetic field at a frequency in response to the provided power, wherein the source circuitry is configured to wirelessly transfer the power to the other circuitry via the magnetic field; and the other circuitry including a receiver resonator configured to receive the magnetic field at the frequency, wherein an amount of gain by the gain circuitry is to automatically adjust towards being balanced by a loss rate associated with the circuitry.

9. The apparatus of claim 8, wherein the gain circuitry is configured and arranged to provide a nonlinear gain that is dependent on the coupling rate between the source circuitry and the other circuitry.

10. The apparatus of claim 8, wherein source resonator is configured and arranged to generate the magnetic field at a frequency that is optimal for wireless power transfer at the coupling rate.

11. The apparatus of claim 8, wherein the gain circuitry includes a voltage amplifier in parallel with a resistor, the voltage amplifier and resistor being configured and arranged to provide a negative resistance.

12. The apparatus of claim 8, wherein the gain circuitry includes:
    a switch-mode amplifier configured and arranged to provide a negative resistance; and
    feedback circuitry configured and arranged with the switch-mode amplifier to offset phase delay caused by the switch-mode amplifier.

13. The apparatus of claim 8, wherein the source circuitry is configured and arranged to transfer wireless power to the other circuitry within a threshold power across a distance between the source circuitry and the other circuitry of between 0.1 meter to 1.0 meter.

14. The apparatus of claim 8, wherein the source circuitry is configured and arranged to reach a steady state at a rate of between 0.1 millisecond to 3 milliseconds as a distance between the source circuitry and the other circuitry changes from 20 centimeters to 1 meter.

15. The apparatus of claim 8, wherein the source circuitry includes a plurality of source circuits located at different locations and each configured and arranged to wirelessly transfer power to the other circuitry.

16. The apparatus of claim 15, wherein the other circuitry is configured and arranged to receive a magnetic field from a source circuit of the plurality of source circuits that is respectively the closest distance to the other circuitry.

17. A method for wirelessly transferring power comprising:
    providing power via gain circuitry of source circuitry that is dependent on a coupling rate between the source circuitry and other circuitry;
    generating a magnetic field at a frequency in response to the provided power via the source circuitry and wirelessly transferring the power to the other circuitry via the magnetic field; and
    receiving the magnetic field at the frequency by the other circuitry, wherein the source circuitry and the other circuitry are configured and arranged to transfer power from the source circuitry to the other circuitry while maintaining parity-time symmetry during the wireless transfer of power.

18. An apparatus comprising:
    source circuitry including:
        gain circuitry configured to provide power to the source circuitry, the power provided being dependent on a coupling rate between the source circuitry and other circuitry; and
        a source resonator configured with the gain circuitry to generate a magnetic field at a frequency in response to the provided power, wherein the source circuitry is configured and arranged to wirelessly transfer the power to the other circuitry via the magnetic field; and
    the other circuitry includes a receiver resonator configured to receive the magnetic field at the frequency, wherein the source circuitry and the other circuitry are configured and arranged to transfer power from the source circuitry to the other circuitry using a parity-time symmetry based wireless power technique.

19. The method of claim 17, further including powering the other circuitry using the received magnetic field, wherein the other circuitry is associated with a moving object; and
    maintaining the transferred power from the source circuitry as received by other circuitry within a threshold while the other circuitry is moving.

20. The method of claim 17, further including maintaining a transfer efficiency of power from the source circuitry as received by other circuitry within a threshold across a range of coupling rates.

21. The method of claim 17, wherein the source circuitry is configured to reach a steady state at a rate of between 0.1 millisecond to 3 milliseconds as a distance between the source circuitry and the other circuitry changes from 20 centimeters to 1 meter.

22. The method of claim 17, wherein the source circuitry includes a source resonator circuit, and wherein the source resonator circuit is to self-adjust an operating frequency of the magnetic field to provide the transfer of power.

23. The method of claim 17, wherein the gain circuitry is to self adjust in response to changes in transfer distance relative to separation between a resonator in the source circuitry and another resonator in the other circuitry.

* * * * *